United States Patent [19]

Hathaway et al.

[11] Patent Number: 4,732,934

[45] Date of Patent: Mar. 22, 1988

[54] FUNCTIONALIZED THERMOPLASTIC POLYMERS, BLENDS PREPARED THEREFROM, AND METHODS FOR PREPARING BLENDS

[75] Inventors: Susan J. Hathaway, Schenectady, N.Y.; Robert A. Pyles, Evansville, Ind.

[73] Assignee: General Electric Company, Schenectady, N.Y.

[21] Appl. No.: 939,391

[22] Filed: Dec. 8, 1986

[51] Int. Cl.$^4$ ............................................. C08L 77/00
[52] U.S. Cl. ........................................ 525/66; 525/67; 525/425; 525/431; 525/433; 525/902; 528/196
[58] Field of Search ............... 525/66, 433, 439, 466, 525/462, 467, 902, 67, 425, 431; 528/196

[56] References Cited

U.S. PATENT DOCUMENTS

| | | | |
|---|---|---|---|
| 4,377,670 | 3/1983 | Krimm et al. | 525/467 |
| 4,431,793 | 2/1984 | Rosenquist | 528/198 |
| 4,446,296 | 5/1984 | Rosenquist | 528/198 |
| 4,448,953 | 5/1984 | Rosenquist et al. | 528/198 |
| 4,584,345 | 4/1986 | Tanaka et al. | 525/67 |

FOREIGN PATENT DOCUMENTS 11654150  9/1975  Japan .
2693676  8/1976  Japan .

Primary Examiner—Theodore E. Pertilla
Attorney, Agent, or Firm—Francis T. Coppa; James C. Davis, Jr.; James Magee, Jr.

[57] ABSTRACT

Thermoplastic materials may be functionalized and then blended with polyamides to form compatible products which contain a copolymer of the functionalized material and the polyamide.

9 Claims, No Drawings

FUNCTIONALIZED THERMOPLASTIC POLYMERS, BLENDS PREPARED THEREFROM, AND METHODS FOR PREPARING BLENDS

The present invention relates to the functionalization of polymers. More particularly, it relates to the capping of thermoplastic polymers with end groups which permit the polymers to form compatible blends with other thermoplastic materials.

BACKGROUND OF THE INVENTION

The use of thermoplastic polymers for many industrial applications is gaining increased acceptance today because of their excellent physical properties. For example, polycarbonates, especially aromatic polycarbonates formed from dihydric phenols, exhibit excellent physical attributes such as tensile strength, impact strength, and thermal stability. However, most polymers are generally deficient in at least one of several properties which curtails their use in certain products. For example, the use of polycarbonates in some applications, e.g., automotive, is limited somewhat because of their poor resistance to various organic solvents and other chemicals. On the other hand, materials such as the polyamides do not generally exhibit the superior physical properties of polycarbonates, but do exhibit excellent chemical resistance. It is thus apparent that a blend of several thermoplastic materials might result in a product possessing the best of each of their individual physical properties.

A particularly promising set of physical properties might result from the combination of the polycarbonates and polyamides discussed above. Blends of polycarbonates and various polyamides have been prepared in the past. For example, Japanese Kokai No. 116541/50 discloses a blend containing 80-95% by weight polycarbonate and 5-20% by weight of nylon 12. Furthermore, Japanese Patent Publication No. 26936/76 discloses adhesive compositions containing 5-40% by weight of a polycarbonate and 60-95% of a polyamide. Moreover, thermoplastic blends containing a polycarbonate and a polyamide along with a conjugated diene rubber copolymer are disclosed in U.S. Pat. No. 4,317,891.

While the polycarbonate/polyamide blends of the prior art may be suitable for some end uses, they generally exhibit serious disadvantages. For example, when molded, they often become severely laminated. Such undesirable lamination is often accompanied by poor impact strength. Furthermore, amine end groups of the polyamide react with carbonate bonds and thereby degrade the polycarbonate portion of the blend, resulting in loss of tensile strength, heat resistance and other desirable characteristics. It is thus readily apparent that the inherent chemical incompatibility between polycarbonates and polyamides results in blends of such materials having properties which are unacceptable for many uses.

It is therefore an object of the present invention to provide improved blends of polymeric materials which overcome the foregoing disadvantages.

It is another object of the present invention to provide a functionalized polycarbonate which is capable of chemical reaction with a polyamide.

It is a yet another object of the present invention to provide a compatible blend of a polycarbonate and a polyamide.

It is a further object to provide a copolymer of a polyamide and a carbonate polymer, and to provide a method for preparing such a copolymer.

It is still another object of the present invention to provide a method for preparing a compatible blend of a polycarbonate and a polyamide which may be molded into parts having excellent tensile strength, impact strength, and chemical resistance.

SUMMARY OF THE INVENTION

The present invention provides a thermoplastic polymer having recurring carbonate units in the main chain and also having functionalizing end groups. When such a polymer is mixed with another polymer, e.g., a polyamide, to form a thermoplastic blend, at least some of the end groups of the functionalized polymer react with the second polymer to form a copolymer. The additional inclusion of a core/shell impact modifier in the blended product as described below results in a material having excellent physical properties such as tensile strength and impact strength, while also exhibiting excellent chemical resistance.

The method of the present invention for forming compatible blends of a functionalized polymer and a second polymer comprises first reacting a hydroxy-terminated carbonate-containing polymer with a functionalizing agent to provide functionalized end groups on the polymer, as described in detail below. The functionalized polymer is then blended with the second polymer at elevated temperatures to obtain the product disclosed above and further described below.

DESCRIPTION OF THE INVENTION

A wide variety of thermoplastic polymers which have recurring carbonate units in the main chain may be functionalized according to the present invention. The number of carbonate units present depends in part upon the end use of the functionalized polymer.

The thermoplastic polymer having recurring carbonate units in the main chain has functionalizing end groups of the formula

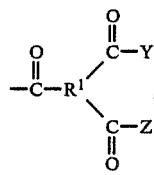

(I)

wherein
  $R^1$ is a trivalent radical selected from the group consisting of aliphatic chains containing about 2-20 carbon atoms and aromatic groups containing about 6-20 carbon atoms; and
  Y and Z are individually selected from the group consisting of hydroxy and alkoxy groups, and when taken together are oxygen.

The thermoplastic polymer having recurring carbonate units in the main chain and functionalized with the end groups described above may be a homopolymer or copolymer, and is hereinafter also referred to as a carbonate polymer. One type of homopolymer particularly suitable for the present invention is an aromatic polycarbonate homopolymer. Such homopolymers are well-known in the art and generally comprise repeating units of the formula

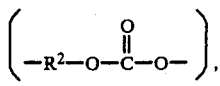

(II)

in which $R^2$ is the divalent residue of a dihydric phenol such as 2,2-bis(4-hydroxyphenyl)-propane (bisphenol A),

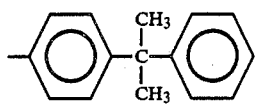

All of these aromatic polycarbonates contain recurring carbonate units. Preferred structures of aromatic polycarbonates of the present invention are those which contain repeating units of the formula

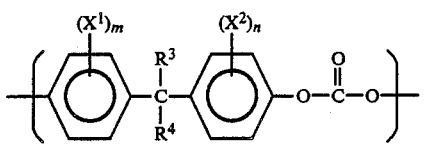

(III)

in which $R^3$ and $R^4$ are hydrogen, halogen, lower alkyl or phenyl; $X^1$ and $X^2$ are lower alkyl or lower alkenyl; and m and n are 0 or integers from 1 to the maximum number of replaceable hydrogen atoms. The terms "lower alkyl" and "lower alkenyl" as used herein refer to alkyl and alkenyl groups having about 1 to about 20 carbon atoms, and more typically from about 1 to about 6 carbon atoms.

Also within the scope of the present invention are flame retardant polycarbonates formed from halogen-containing polycarbonate oligomers. Such polycarbonates are usually prepared with substituted dihydric phenols, e.g., 2,2-bis(3,5-dibromo-4-hydroxyphenyl) propane, commonly referred to as tetrabromobisphenol A.

Polycarbonates may be prepared by several well-known methods. For example, preparation may be accomplished by reacting a dihydric phenol such as bisphenol A with a carbonate precursor. A wide variety of other dihydric phenols may be used in the present invention; many are disclosed in U.S. Pat. Nos. 2,999,835; 3,028,365; 3,334,154; 4,190,681; and 3,160,121, all incorporated herein by reference. Many carbonate precursors may be used; they are typically either a carbonyl halide, a carbonate ester, or a haloformate. Exemplary carbonate precursors are described in U.S. Pat. No. 4,190,681.

Specific methods for the preparation of polycarbonates are described in U.S. Pat. No. 3,989,672, also incorporated herein by reference. In addition to forming polycarbonates by reacting a dihydric phenol with a carbonate precursor, they may also be prepared by transesterification processes well-known in the art and described, for example, in D. Fox's U.S. Pat. No. 3,153,008, incorporated herein by reference. Such an alternative preparation method is particularly preferred in the present invention because the resulting polymers are substantially hydroxy-terminated, as described below.

The thermoplastic polymer containing recurring carbonate units may comprise a copolymer. "Copolymer" as used herein is meant to include polymeric materials containing monomeric carbonate units as described above along with at least one additional type of monomeric unit, e.g., carboxylate units, siloxane units, ether units, and the like. The selection of a particular copolymer will depend on the properties desired for specific products made with compositions of the present invention.

Exemplary copolymers falling within the scope of the present invention are the copolyester-carbonate resins which generally contain recurring carbonate groups and carboxylate groups. These polymers are well-known in the art, and are generally prepared by reacting (a) a carbonate precursor such as those described above;

(b) at least one dihydric phenol as described above; and (c) at least one difunctional carboxylic acid or reactive derivative thereof. Exemplary copolyester-carbonate compositions particularly suitable for the present invention are described in U.S. Pat. No. 4,487,896, incorporated herein by reference. These materials exhibit excellent processability characteristics in molding or extrusion applications. Specific examples of copolyester-carbonates include those prepared from a mixture of bisphenol A, phosgene and iso- and terephthalic acids or reactive derivatives thereof, e.g., isophthaloyl chloride and terephthaloyl chloride. The molar concentration of ester units in such polymers may vary widely with the proviso that recurring carbonate units as defined above are present in the main chain of the polymer.

Another suitable class of thermoplastic copolymers which may be functionalized according to the present invention are the organopolysiloxane-polycarbonate block copolymers, such as those described in U.S. Pat. No. 3,189,662, issued to the assignee of the present application and incorporated by reference herein. Such copolymers generally comprise diorganosiloxy units consisting essentially of dialkylsiloxy units connected to each other by silicon-oxygen-silicon linkages, wherein each of the silicon atoms may have at least one organic substituent attached thereto; and polycarbonate blocks which may be formed as described above.

Generally speaking, the polymers which are to be functionalized with end groups according to the present invention have intrinsic viscosities between about 0.3 and about 1.0. Factors determining the selection of a particular intrinsic viscosity include the desired physical properties of products formed from these polymers, as well as the processing conditions to which the polymers will be subjected.

The thermoplastic polymers of the present invention are hydroxy-terminated prior to reaction with the functionalizing agent. Methods of forming hydroxy-terminated polymers are well-known in the art. For example, the polymers may be hydrolyzed with an alkali metal hydroxy compound such as sodium hydroxide or potassium hydroxide in an organic solvent. Furthermore, hydroxy-terminated polycarbonates may be prepared via ester interchange during the melt polymerization of a dihydric phenol with diphenyl carbonate, as described in U.S. Pat. No. 3,153,008.

The degree of hydroxy termination is generally high in the present invention because the aromatic carbonate units are very amenable to hydrolytic action. Typically, at least 80% of the carbonate sites on the homopolymer or copolymer become hydroxy-terminated by any of the methods discussed above.

The hydroxy-terminated carbonate polymers are then functionalized by reaction with a functionalizing agent. Functionalizing agents useful in the present invention are those capable of reacting under appropriate conditions to form the

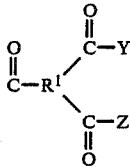

unit of formula (I), described above. Aliphatic and aromatic diacids may be used as the functionalizing agent of the present invention if they contain an additional carbonyl-containing substituent capable of reacting with the hydroxy-terminated polymer, even after possible condensation of the diacid to an anhydride. Benzenepolycarboxylic acids meeting such a requirement are particularly suitable for the present invention. Illustrative examples include 1,2,3-benzenetricarboxylic acid and its isomers; and 1,2,3,4-benzenetetracarboxylic acid and its isomers. Each of these acids may be reacted with the hydroxy-terminated polymer described above to functionalize the polymer.

Ester derivatives of the above-described diacids may also be used to functionalize the carbonate polymers, subject to the proviso that the esters contain an additional carbonyl-containing substituent for bonding to the carbonate polymer, and that they also be capable of reacting to form anhydrides after functionalizing the polymer in the event that the polymer is to be reacted with a second polymer, as described below. Thus, ester derivatives appropriate for the present invention include

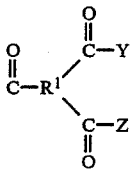

units in which Y or Z may individually be alkoxy groups. In one aspect, at least one of Y or Z is a hydroxyl group. Illustrative ester derivatives suitable for the present invention include those in which Y and Z individually may be methyl, ethyl, propyl, butyl, t-butyl, isopropyl, isobutyl or phenyl, and those in which Y and Z may contain various substituents attached thereto, such as halogens, sulfur, and other alkyl or alkoxy groups, with the proviso that such substituents not inhibit the subsequent reaction of the functionalized polymer with a second polymer, as described below.

When ester-containing functionalizing agents are utilized and the functionalized polymer is then reacted with a second polymer at elevated temperatures in an extruder, alcohol by-products may be formed. Such by-products may plasticize the extruded product and thus should be eliminated by well-known venting means when plasticization is not desired.

Another useful functionalizing agent for the present invention is an anhydride, i.e., in formula (I), Y and Z taken together are oxygen. The anhydride must contain an additional carbonyl-containing substituent for bonding to the hydroxy-terminated polymer. Illustrative substituents of this type are halocarbonyls such as

Examples of anhydrides suitable for the present invention include trimellitic anhydride acid chloride and a compound of the formula

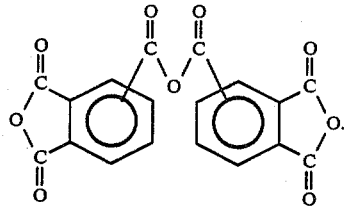

Those skilled in the art appreciate that the above-mentioned esters and diacids may also be converted into anhydrides when heated.

Reaction of the carbonate polymer with the functionalizing agent may be accomplished by well-known methods. For example, when the functionalizing agent is an anhydride, the agent is first dissolved in an alkyl amine-based solution such as triethylamine. The agent-/alkylamine complex thus formed may then be added to an organic solution of the carbonate polymer, followed by stirring at room temperature. The reaction is typically completed within a short period of time, e.g., less than 90 minutes, and with high yields of the functionalized product. Other reaction methods within the scope of this invention will occur to those skilled in the art.

The carbonate polymer having the appropriate functionalizing end groups thereon may then be isolated by well-known methods, e.g., steam precipitation, in which the polymer solution is contacted by high pressure steam which flashes off the organic solvent, leaving the dried polymer product. However, isolation methods which involve precipitation through the use of organic hydroxy compounds, e.g., methanol precipitation, should be avoided when plasticization of the end product is deemed undesirable.

The functionalized carbonate polymer may be blended with a second thermoplastic polymer, as described above. "Blend" as used herein is meant to define a physical combination of two or more materials which may additionally involve chemical reaction between the two materials. The particular thermoplastic polymer to be blended with the functionalized polymer will of course depend on the end use of the blended product.

When molded parts formed with the blended product must exhibit a high degree of chemical resistance, particularly useful polymers to be blended with the functionalized polymer are the polyamides, which are well-known in the art. Detailed descriptions of many of them may be found in the Kirk-Othmer Encyclopedia of Chemical Technology, Third Edition. Selection of particular polyamides for use in the composition of the present invention of course depends on the contemplated use of the product. For example, amorphous polyamides, i.e., those not having any molecular crystal structure, may enhance dimensional stability in thermoplastic blends because of their tendency not to absorb as much moisture as crystalline polyamides, and are therefore especially useful as a component in compositions for molded parts which will be exposed to a moisture-containing environment. Furthermore, amorphous polyamides utilized in blends which also contain the impact modifier described below exhibit other excellent physical properties, as described in the following examples. Moreover, blended products of the present invention containing amorphous polyamides possess excellent barrier properties, i.e., they exhibit very low permeability to the passage of gases such as oxygen, nitrogen, and carbon dioxide, thereby making them excellent materials for beverage containers.

Crystalline polyamides are also within the scope of the present invention and are useful in molded products which require a high level of tensile strength, e.g., automobile parts. It will be apparent to those skilled in the art that the processes described herein for preparing polymer blends are amenable to the use of either amorphous or crystalline polyamides.

The formation of a compatible blend of the polyamide and the functionalized carbonate polymer of the present invention requires a sufficient degree of amine end group termination on the polyamide prior to blending. The particular level of amine end group concentration will depend in part upon physical properties desired for the product. For example, higher amine end group concentrations generally result in greater impact strength for the material. Furthermore, the amine end group concentration may in part be dependent upon the particular agent used to functionalize the carbonate polymer. A preferred amine end group concentration will range from about 20 gram milliequivalents amine per kilogram polyamide (g·meq/kg) to 120 g·meq/kg. Amine end group concentrations above this range may cause some degradation of the carbonate bonds in the functionalized polymer, as evidenced by a decrease in molecular weight of the polycarbonate-containing polymer. However, some carbonate degradation may be tolerated, i.e., a significant decrease in the physical properties of the blend does not occur, as described below in the examples. Copolymer formation between the functionalized carbonate polymer and the polyamide may be less likely to occur if the amine end group concentration of the polyamide is less than 20 g·meq/kg.

Some of the well-known polyamides suitable for use in the compositions of the present invention may be prepared by polymerizing a monoamino-monocarboxylic acid or a lactam thereof having at least two carbon atoms between the amino and carboxylic acid group. An alternative preparation involves polymerizing substantially equimolar proportions of a diamine containing two carbon atoms between the amino groups and a dicarboxylic acid; or by polymerizing a monoaminocarboxylic acid or a lactam thereof together with substantially equimolecular proportions of a diamine and a dicarboxylic acid. Non-limiting examples of the above-mentioned monoamino-monocarboxylic acids or lactams thereof are described in the Kirk-Othmer Encyclopedia of Chemical Technology, Third Edition, Volume 18.

Examples of diamines which are suitable for preparing polyamides are those of the general formula $$H_2N(CH_2)_nNH_2$$

wherein n is an integer of from 2 to 16.

The dicarboxylic acids for the polyamide are typically aromatic acids, e.g., isophthalic and terephthalic acid. However, dicarboxylic aliphatic acids having the formula $$HOOC-R^6-COOH$$

may also be used, wherein $R^6$ represents a divalent aliphatic group containing at least two carbon atoms.

Specific examples of polyamides suitable for the present invention include those commonly referred to as nylon 6; nylon 4; nylon 6/9; nylon 6/6; and nylon 6/12, as well as those derived from terephthalic acid and trimethylhexamethylene diamine; those derived from adipic acid, azelaic acid and 2,2-bis-(4-aminocyclohexyl)propane; and those derived from terephthalic acid and isophthalic acid with 4,4'-diamino-dicyclohexylmethane or meta-xylylenediamine.

Specific examples of amorphous polyamides suitable for the present invention include those prepared from a mixture of a diamine such as hexamethylene diamine and isophthalic and/or terephthalic acids. SELAR Pa., a product of E. I. Dupont Company, is exemplary of this type of amorphous polyamide. Other commercial amorphous polyamides suitable for the present invention include Zytel 330 and Bexloy C, also sold by Dupont Company; Trogamid T, a product of Dynamit Nobel Company; and Grilamid TR55, a product of Emser Werke Company.

Various copolymers of polyamides and blends of polyamides with other compatible polymers are also within the scope of the present invention as the material to be blended with the functionalized polymer. Preferred compositions contain at least about 40% by weight polyamide in the resin phase. Illustrative examples of such resins include blends or copolymers of polyamides with polypropylene, polyethylene, polyethyleneimine, polystyrene, polyacrylonitrile, polybutadiene, acrylonitrile-containing rubbers, styrene-acrylonitrile copolymers, and polyphenylene ether.

Suitable impact modifiers may be used to enhance the impact resistance of compositions of the present invention. Preferred impact modifiers are those of the core/shell type because of their ability to greatly increase impact strength properties in the compositions disclosed herein. "Core/shell" as used herein is meant to describe any of the wide varieties of materials which contain a polymeric core physically and/or chemically associated with at least one surrounding shell of another polymeric material. Thus, core/shell modifiers include both materials formed from bonding, i.e., grafting between functional sites on the core and on an adjacent shell, and materials in which polymeric chains of the core merely interpenetrate polymeric chains of a shell, without grafting.

In general, the impact modifiers may contain either a rigid core surrounded by a non-rigid layer, or a non-rigid core surrounded by a rigid layer. The rigid materials typically are methacrylate ester monomers or homopolymers of an aromatic vinyl compound. The materials may also be copolymers of aromatic vinyl compounds with various acrylic esters. The non-rigid materials are typically diene rubbers such as polybutadiene.

The preferred core/shell impact modifiers of the present invention are those of the core/shell graft copolymer type. Such copolymers are well-known in the art and are available commercially, for example, from Rohm and Haas Company. Preferred core/shell copolymers are those comprising a diene rubber, an aromatic vinyl compound, and a methacrylate ester monomer in a multilayer structure wherein a rigid acrylate ester core is grafted to a non-rigid diene rubber layer, which in turn is grafted to another rigid layer formed from either an aromatic vinyl compound or an acrylate ester or mixtures thereof. Acryloid KM 653, a product of Rohm and Haas Company, is believed to be exemplary of this type of impact modifier. These and other suitable core/shell impact modifiers suitable for use in the presently disclosed invention are described in U.S. Pat. Nos. 4,584,345; 4,292,233; 4,180,494; 4,096,202; 4,034,013; and 3,808,180, all incorporated herein by reference.

The component levels in the thermoplastic composition of the present invention will be dictated by the end use of the composition. For example, in those instances in which the attributes of an impact modifier are not required, the composition may comprise, in combination:

(a) about 30% by weight to about 70% by weight of the functionalized carbonate polymer; and (b) about 30% by weight to about 70% by weight of the polyamide described above.

Especially preferred compositions are those containing a 1:1 weight ratio of functionalized carbonate polymer to polyamide. Higher levels of the functionalized polymer within the above-described range are useful when higher levels of tensile strength are desired for products prepared from the composition. Higher levels of the polyamide within the above-described range are desirable when a higher degree of chemical resistance is desired for the product prepared from the composition. The examples described below more accurately demonstrate the balancing of physical and chemical properties for these materials.

When an impact modifier as described above is included in the composition of the present invention, its proportionate level will also be dictated by the end use of the composition. Typically, the impact modifier will comprise from about 4% by weight to about 20% by weight of the total weight of the blended product. Lower concentrations of the impact modifier within the above-described range are particularly suitable when the composition contains an amorphous polyamide and is molded into containers which provide barrier resistance to the passage of oxygen and carbon dioxide. In such an application, a preferred composition comprises about 45% by weight of the polyamide; about 45% by weight of the functionalized carbonate polymer; and about 10% by weight of the impact modifier.

Higher concentrations of the impact modifier within the above-described range are particularly suitable when the composition includes crystalline polyamides and is used for molded parts requiring a high degree of both tensile strength and impact strength. In such an application, a preferred composition comprises about 40% by weight of the polyamide, about 40% by weight of the functionalized carbonate polymer; and about 20% by weight of the impact modifier.

The components of the present invention, i.e., the functionalized carbonate polymer; the polyamide material; and optionally, the impact modifier, may be blended by well-known methods. For example, they may simply be mixed at room temperature until uniformity is achieved. The well-mixed dry blend of materials, which may be in the form of powder, pellets, or a combination thereof, is then extruded into pellets. Alternatively, the dry blend might be injection molded.

When parts formed from the composition of the present invention are to be extruded, extrusion temperatures generally range from about 230° C. to about 290° C. At such elevated temperatures, a compatible blend of the material, as described above, is formed. The particular temperature utilized will depend on many factors, such as the particular polymeric components employed, the amine end group concentration; the consistency and general workability of the dry blend; and the extruder screw speed. Material exiting from the extruder may then be quenched in water, pelletized, and then dried by suitable means, e.g., the use of a circulating air oven.

Those skilled in the art appreciate that materials of the present invention may be subjected to a wide variety of plastics processing techniques, e.g., injection molding, blow molding, displacement blow molding, thermoforming, as well as coextrusion processes with other thermoplastic materials. Furthermore, the thermoplastic composition may be formed into various products, such as sheet, film, containers, and the like.

As further described in the examples, blending of the functionalized carbonate polymer with the polyamide results in a highly compatible physical blend of the materials accompanied by copolymerization of the materials. While the inventors of the present subject matter do not wish to be bound by any theory concerning the relationship between copolymer formation and the physical properties of the resultant products, it is thought that the copolymer represents the formation of an imide linkage between some of the end groups of the functionalized polymer and the amine-terminated sites on the polyamide. Thus, the present invention includes within its scope a copolymer of a polyamide and a thermoplastic polymer having recurring carbonate units in the main chain. The formation of the copolymer appears to greatly contribute to the enhanced properties of the blended composition, i.e., high tensile strength, ductility, and moldability. Furthermore, unlike prior art blends, e.g., of polycarbonates and polyamides, the presently-disclosed composition using such polymers is a physically attractive material which is visually monolithic, i.e., the material does not possess any of the macrolaminar characteristics of prior art blends of these same materials.

Furthermore, molded parts formed from the thermoplastic compositions of the present invention exhibit a high level of resistance to organic solvents.

The thermoplastic composition of the present invention may further include a wide variety of additives to improve various chemical and physical properties. Examples of such additives include flame retardants, stabilizers, anti-oxidants, mold processing aids, colorants, and fillers such as mica, silica, clay, and the like. The appropriate types and levels of such additives will of course depend on processing techniques and on the end use of the resultant product, and may be determined by those skilled in the art without undue experimentation.

The following specific examples describe novel embodiments of the present invention and procedures used therein. They are intended for illustrative purposes only and should not be construed as a limitation upon the broadest aspects of the invention.

EXAMPLE 1

A bisphenol A-based polycarbonate having a molecular weight of 40,000, in which 100% of the end groups were hydroxy-terminated, was used for functionalization by an anhydride according to the present invention.

10 g of the polycarbonate were dissolved in 100 ml of methylene chloride under a nitrogen atmosphere to form solution A. 1.4 mmol of trimellitic anhydride acid chloride were dissolved in 5 ml of methylene chloride, followed by the addition of 1.4 mmol of triethylamine, to form solution B, which was immediately poured into solution A. The resulting solution was stirred at room temperature for 60 minutes and then successively washed in a 5% aqueous hydrochloric acid solution and a 1% aqueous hydrochloric acid solution. The solution was further washed twice with water to remove residual hydrochloric acid.

The resulting anhydride-functionalized polycarbonate was identified by a high field NMR apparatus as having at least 1.5 trimellitic anhydride acid chloride units per chain. Fourier Transform-Infrared analysis indicated that the polycarbonate was 100%-functionalized with the anhydride.

EXAMPLE 2

Various blends of polyamides with the anhydride-functionalized polycarbonates of Example 1 were prepared. Polyamide A was a crystalline nylon 6 sold by the Nylon Corporation of America as NYCOA 471. Polyamide B was an amorphous polyamide sold by E. I. Dupont Corporation as SELAR Pa. The polycarbonate and polyamide, each in pellet form, were tumble mixed on a roll mill for 20 minutes according to the proportions listed in Table 1. The well-mixed dry blend was extruded in a Welding Engineers twin screw extruder at 277° C. The extrudate was then quenched in water, pelletized, and dried at 100° C. in a circulating air oven. The dried material was injection molded in a 15 Ton Boy injection molding machine.

The data in Table 1 was generally obtained by ASTM procedures. Notched Izod impact strength was determined according to ASTM D-256, and percent elongation was performed according to ASTM D-638. The presence of lamination was determined by visual examination of the fracture surface of the Izod bar sample.

TABLE 1

| Sample No. | Polycarbonate (wt. %) | Polyamide Type (& wt. %) | Molecular Weight of Recovered Polycarbonate | Notched Izod (ft.-lb. in.) | Elongation at Break (%) |
|---|---|---|---|---|---|
| 1 | 50 | A, 50 | 23,800 | — | — |
| 2 | 67 | A, 33 | 33,200 | — | — |
| 3 | 75 | A, 25 | 41,100 | 0.26 | 28 |
| 4 | 90 | A, 10 | 39,400 | 0.40 | 81 |
| 5 | 50 | B, 50 | — | 0.80 | — |

Samples 3 and 4 exhibited little, if any, carbonate unit degradation in the functionalized polycarbonate, as shown by the comparison between the recovered molecular weights and the initial polycarbonate molecular weight of 40,000. Such desirably low levels of polymer degradation were achieved in part in samples 3 and 4 because there were present at least 2 molar equivalents of anhydride per 1 molar equivalent of amine end group.

Sample 1 appeared to be somewhat brittle, while sample 2 exhibited some delamination between the polyamide and the polycarbonate portions of the sample material.

Sample 4 exhibited elongation characteristics which would be acceptable for certain end uses which did not additionally require a high level of impact strength.

Sample 5 was tested for Gardner impact strength according to ASTM D-1709. The value obtained was about 20 in.-lb. As in sample 4, the composition used to form this sample would be suitable for applications not requiring a high level of impact strength.

EXAMPLE 3

Extruded pellets of each of the compositions of Example 2 were dried and then ground in a mill. 10 g of the resulting coarse powder were put into a Soxhlet extraction thimble and extracted with 400 ml of refluxing chloroform for about 10 hours. The chloroform extract, i.e., the recovered, unreacted polycarbonate, was concentrated in vacuo, dried, and then weighed to determine the percent of recovered polycarbonate.

The residue in the thimble, consisting of a mixture of polycarbonate/polyamide copolymer and recovered unreacted polyamide, was dried and weighed to determine the percent of copolymer and recovered polyamide.

0.5 g of the insoluble copolymer/polyamide mixture was stirred at room temperature in 5 ml of an organic solvent and then boiled for about 5–10 minutes. The copolymer/polyamide did not dissolve at this time. The material was then dissolved in a boiling solution of phenol and methanol and then cooled to room temperature and diluted with chloroform. Carbon 13 NMR analysis performed on the solution indicated that polyamide and polycarbonate were present in the copolymer in about a 1:1 weight ratio, although some of the polycarbonate aromatic NMR signals were obscured by solvents.

EXAMPLE 4

This example describes compositions of the present invention intended for applications requiring high levels of impact strength.

A hydroxy-terminated polycarbonate prepared by a melt polymerization process and having a molecular weight of 37,000 was functionalized with trimellitic anhydride acid chloride as described in Example 1. Polyamides A and B were identified above. Polyamide C was Capron 8200, a crystalline polyamide (Nylon 6) sold by Allied Chemical Company, having an amine end group concentration of 46 g·meq/kg material. Polyamide D was a crystalline aromatic polyamide having an amine end group concentration of 60 g·meq/kg material. The impact modifier used was Acryloid KM653, unless otherwise indicated below. The polycarbonate, polyamide and impact modifier were mixed, extruded, and dried by the procedure described above, and in the proportions listed in Table 2. Injection molding of the resulting material was performed in the manner of Example 2.

The ASTM tests described above were again used. Solvent resistance was determined by comparing impact strength before and after gasoline immersion. In this test, 0.125 inch thick Izod bars of the material having a measured impact strength were clamped in 3,400 psi strain jigs and then immersed in unleaded gasoline for 1 hour. The bars were then dried, and after 30 minutes, were notched for measurement of impact strength.

Heat distortion temperature was measured by ASTM D-648. Unnotched Izod was measured by D-1709. Dynatup impact was measured by D-1709.

The following test results were obtained for the compositions of Example 3.

the test. If any microcracks were present, the samples were deemed to have failed the test.

TABLE 2

| Sample No. | Functionalized Polycarbonate (wt. %) | Polyamide type (& wt. %) | Impact modifier (wt. %) | Tensile strength at yield (psi) | Tensile strength at break (psi) | Elongation at break (%) | Initial Notched Izod (ft-lb/in) | Post-Immersion Notched Izod (ft-lb/in) |
|---|---|---|---|---|---|---|---|---|
| 6 | 72 | A, 8 | 20 | 6176 | 5961 | 119 | 8.3 | — |
| 7 | 60 | A, 20 | 20 | — | — | 192 | 8.8 | — |
| 8 | 64 | A, 21 | 15 | — | — | 175 | 4.5 | — |
| 9 | 60 | A, 20 | 20 | 6613 | 6699 | 169 | 6.2 | — |
| 10 | 40 | A, 40 | 20 | 7042 | 7281 | 192 | 6.5 | 4.4 |
| 11 | 48 | A, 32 | 20 | 6926 | 7330 | 190 | 6.0 | 3.3 |
| 12 | 32 | A, 48 | 20 | 7473 | 8128 | 241 | 10.9 | 9.3 |
| 13 | 40 | B, 40 | 20 | 9648 | 11,209 | 211 | 10.8 | — |
| 14 | 42.5 | A, 42.5 | 15$^a$ | 7837 | 8186 | 217 | 11.3 | 11.2 |
| 15 | 40 | C, 40 | 20 | 7124 | 7336 | 208 | 9.7 | 9.8 |
| 16 | 60 | A, 20 | 20$^b$ | 6617 | 6888 | 169 | 6.2 | — |
| 17 | 64 | A, 21 | 15$^b$ | 7319 | 7584 | 182 | 1.7 | — |
| 18 | 60 | D, 40 | 20 | — | — | — | 10.6 | 11.8 |

A = Nycoa 471.
B = Selar PA
C = Capron 8200, a crystalline polyamide (Nylon 6) sold by Allied Chemical Company, having an amine end group concentration of 46 g meg/kg material.
D = Capron XPN 1250, a crystalline polyamide sold by Allied Chemical Company, having an amine end group concentration of 60 g mg/kg material.
$^a$ = KM 653 reprocessed with antioxidants added after polymerization process; small amounts of polyethylene added.
$^b$ = KM 653 reprocessed with antioxidants added during polymerization process.

Table 2 demonstrates that samples 10–18 generally exhibited excellent tensile and impact characteristics. Samples 12–18 exhibited excellent solvent resistance, as shown by the retention of impact strength after gasoline immersion. Samples 15 and 18 exhibited 100% impact strength retention after solvent exposure.

Furthermore, any polycarbonate degradation which might have occurred, as evidenced by the loss of polycarbonate molecular weight where measured, did not result in a significant loss of tensile strength. A possible explanation is that, apparently, polycarbonate degradation was offset by the formation of the polycarbonate-polyamide copolymer discussed above.

Samples 6–9 exhibited good tensile and impact characteristics but cracked after immersion in gasoline. The compositions utilized therein would be suitable for end uses requiring good impact and tensile strength but not requiring chemical resistance.

Furthermore, samples 6–18 all had a smooth appearance without any sign of lamination. They also exhibited a high degree of moldability.

EXAMPLE 5

Samples 19 and 20 are within the scope of the present invention and were formed from compositions prepared by the procedures described in Examples 1 and 2, and in the proportion listed in Table 3. The molecular weight of the polycarbonate was 37,000. Sample 19 employed the crystalline polyamide, Capron 8200, while sample 20 employed the amorphous nylon, SELAR Pa. The impact modifier employed was Acryloid. KM653. The ASTM tests described above were also used here, unless otherwise indicated.

The Buick Gasoline Resistance Test was performed by first drilling holes in the center of two injection molded plaques of the material being evaluated. The plaques were then bolted together to form the test piece, and a torque of 20 ft.-lb. was applied thereto. The test piece was then placed in a tank of unleaded gasoline for 16 hours, removed, and dried. After 4 hours, the piece was immersed again. This cycle was performed 16 times. The bolt was then removed, and the area around each hole was visually examined. If no microcracks were present, the samples were deemed to have passed

TABLE 3

|  | Sample 19 | Sample 20 |
|---|---|---|
| Functionalized Polycarbonate (wt. %) | 40 | 47 |
| Polyamide type (wt. %) | 40, Type C | 47, Type B |
| Impact Modifier (wt. %) | 20 | 6 |
| Tensile strength (at yield) | 6704 psi | 9732 psi |
| Tensile strength (at break) | 7278 psi | 10,226 psi |
| Tensile Elongation | 208 | 178 |
| Flexural Yield | 10,220 psi | — |
| Flexural Modulus | 250,300 psi | — |
| Heat Distortion Temperature (66 psi) | 128° C. | — |
| ⅛" Notched Izod | 11.0 | No breakage |
| ⅛" Unnotched Izod | 39.3 | — |
| Gardner Impact Strength (70° F.) | 574 in.-lb. | — |
| Dynatup Impact Strength (−20° F.) | 479 in.-lb. | — |
| Buick Gasoline Resistance Test | Pass | — |

The data in Table 3 indicates that blends containing either the amorphous or crystalline polyamides exhibited excellent physical properties, such as tensile strength and impact strength. Furthermore, the crystalline nylon-containing blend of sample 19, intended in part for automobile applications, was subjected to the severe treatment of the Buick Test, and easily passed.

Modifications and variations of the present invention might be desirable in light of the above teachings. It is, therefore, to be understood that changes may be made in the particular embodiments of the invention described herein which are within the full intended scope of the invention as defined by the appended claims.

What is claimed is:

1. A thermoplastic blend comprising the following, and reaction products thereof:
   (a) about 30% by weight to about 70% by weight of a thermoplastic polymer having recurring carbonate units in the main chain and end groups of the formula

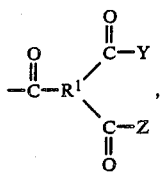

wherein

R¹ is a trivalent group selected from the group consisting of aliphatic chains containing about 2-20 carbon atoms and aromatic groups containing about 6-20 carbon atoms; and Y and Z are individually selected from the group consisting of hydroxy and alkoxy groups, wherein Y and Z taken together are oxygen; and (b) about 30% by weight to about 70% by weight of a polyamide.

2. The blend of claim 1 further comprising an impact modifier.

3. The blend of claim 2 wherein component (a) is a copolyester-carbonate polymer.

4. The blend of claim 2 wherein component (a) is an organopolysiloxane-polycarbonate block copolymer.

5. The blend of claim 2 wherein the polyamide is amorphous.

6. The blend of claim 2 wherein the polyamide is crystalline.

7. The blend of claim 2 wherein the impact modifier has a core/shell structure.

8. The blend of claim 7 wherein component (a) is the reaction product of 2,2-bis(4-hydroxyphenyl)propane and a carbonate precursor, said product functionalized by trimellitic anhydride acid chloride.

9. A copolymer of a polyamide and a functionalized thermoplastic polymer having recurring carbonate units in the main chain.